US009055092B2

(12) United States Patent
Wen et al.

(10) Patent No.: US 9,055,092 B2
(45) Date of Patent: Jun. 9, 2015

(54) METHOD AND SYSTEM FOR GROUPING DIAGNOSTIC INFORMATION

(75) Inventors: Han C. Wen, San Jose, CA (US);
George Zloulas, Sunnyvale, CA (US);
Masood Ahmed, Milpitas, CA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 2713 days.

(21) Appl. No.: 10/937,986

(22) Filed: Sep. 10, 2004

(65) Prior Publication Data

US 2006/0069768 A1    Mar. 30, 2006

(51) Int. Cl.
*G06F 15/173* (2006.01)
*H04L 29/06* (2006.01)
*H04L 12/24* (2006.01)
*H04L 12/26* (2006.01)
*H04M 7/00* (2006.01)

(52) U.S. Cl.
CPC ......... *H04L 63/1408* (2013.01); *H04L 41/0893* (2013.01); *H04L 43/0876* (2013.01); *H04M 7/0084* (2013.01)

(58) Field of Classification Search
CPC ............ H04L 63/1408; H04L 43/0876; H04L 41/0893; H04M 7/0084
USPC .......... 709/204, 220–229, 246, 218; 370/270, 370/465, 477, 351–358; 310/26–28; 705/1–5
See application file for complete search history.

(56) References Cited

U.S. PATENT DOCUMENTS

| 5,712,981 | A  * | 1/1998 | McKee et al. ................. 709/241 |
| 6,691,165 | B1 * | 2/2004 | Bruck et al. ................... 709/227 |
| 6,801,940 | B1 * | 10/2004 | Moran et al. ................... 709/224 |
| 8,717,911 | B2 * | 5/2014 | Bugenhagen et al. ........ 370/252 |
| 2003/0229613 | A1 * | 12/2003 | Zargham et al. .................. 707/1 |
| 2005/0286434 | A1 * | 12/2005 | McKee et al. ................. 370/252 |

OTHER PUBLICATIONS

Marik Marshak et al., "Evaluating web user perceived latency using server side measurements" Computer Communications, 26 (2003) 872-887.*

Mogul et al., 'Internet standard subnetting procedure', Network Working Group, Aug. 1985.*

* cited by examiner

*Primary Examiner* — John Macilwinen
(74) *Attorney, Agent, or Firm* — Park, Vaughan, Fleming & Dowler LLP (57) ABSTRACT

Client network traffic data and server network traffic data regarding a number of network nodes is collected and then grouped by IP address. The network nodes are divided into logical groupings and the network traffic data is presented in the aggregate for all IP addresses in each logical group. The logical groupings may be further divided by protocol, application, port and/or logical group-to-group. Each logical group can be further generalized as either a set of IP addresses (e.g., a business group) or a specific logical link between one set of IP addresses to another set of IP addresses (e.g., a business group link). Either or both of these "groups" may be divided in further logical sub-groups: for example, by protocol, application, port and in the case of business groups, group-to-group. The logical groups provide facilities for initial problem detection and identification while the logical sub-groups provide facilities for troubleshooting and problem isolation.

54 Claims, 5 Drawing Sheets

| Group | Information | Throughput (Inbound and Outbound) [Mbit/sec] | Throughput (Inbound) [Mbit/sec] | Throughput (Outbound) [Mbit/sec] | Round Trip Time (Outbound) [msec] |
|---|---|---|---|---|---|
| ○ NV Headquarters | NP corporate office | | | | |
| ○ Local Traffic | Local Traffic | 0.700 | | 0.303 | 161.943 |
| ○ Connected Groups | Connected Groups | 0.789 | | 0.395 | 55.030 |
| Internet | Internet | | | | |
| NV - Employees | NV - Employees | 0.691 | 0.296 | | 245.504 |
| NV - Exchange Server | NV - Exchange Server | 0.347 | 0.062 | 0.285 | 60.524 |
| VPN Remote Users | VPN Remote Users | 0.118 | 0.090 | 0.028 | 39.441 |
| NV - VPN Gateway | NV - VPN Gateway | 0.017 | 0.006 | 0.010 | 110.843 |
| ○ Connected IPs | Connected IPs | 0.014 | 0.007 | 0.008 | 18.663 |
| ○ 64.175.238.156 | adsl-64-175-238-156.ds... | 0.233 | 0.048 | 0.185 | 31.478 |
| 10.10.0.28 | npcorpdcl.fractal.netw... | 0.233 | 0.048 | 0.185 | 31.478 |
| 10.10.0.56 | vantagel.fractal.netwo... | 0.000 | 0.000 | 0.000 | |
| ○ 81.250.122.163 | AOrleans-201-1-4-163.w... | 0.108 | 0.010 | 0.098 | 360.054 |
| ○ 210.61.218.113 | 210-61-218-113.HINET-I... | 0.069 | 0.067 | 0.001 | |
| ○ 24.187.236.134 | ool-18bbec86.dyn.opton... | 0.057 | 0.003 | 0.055 | 104.758 |
| ○ 80.119.220.174 | 80.119.220.174 | 0.017 | 0.001 | 0.016 | |
| ○ Member IPs | Member IPs | | | | |
| ○ 10.10.0.28 | npcorpdcl.fractal.netw... | 0.443 | 0.168 | 0.275 | 40.744 |
| 64.175.238.156 | adsl-64-175-238-156.ds... | 0.233 | 0.048 | 0.185 | 31.478 |
| 81.250.122.163 | AOrleans-201-1-4-163.w... | 0.108 | 0.098 | 0.010 | 360.065 |
| 24.187.236.134 | ool-18bbec86.dyn.opton... | 0.057 | 0.003 | 0.055 | 104.788 |
| 10.10.0.27 | npcorpexch1.fractal.ne... | 0.014 | 0.007 | 0.007 | 37.161 |
| ○ 67.165.149.122 | c-67-165-149-122.clien... | 0.012 | 0.003 | 0.009 | 187.491 |
| ○ 10.10.2.74 | 10.10.2.74 | 0.254 | 0.208 | 0.045 | |
| ○ 10.10.0.18 | fox.fractal.networkphy... | 0.252 | 0.045 | 0.207 | 46.672 |
| ○ 10.10.0.27 | npcorpexch1.fractal.ne... | 0.119 | 0.028 | 0.091 | 90.240 |
| ○ 10.10.2.127 | 10.10.2.127 | 0.100 | 0.007 | 0.093 | 970.075 |
| ○ IP Protocols | IP Protocols | | | | |
| ○ GRE | VPN Traffic | 0.424 | 0.158 | 0.266 | |
| ○ TCP | TRANSMISSION CONTROL P... | 0.224 | 0.120 | 0.104 | 161.943 |
| ○ Applications | Applications | | | | |
| ○ HTTP TCP | HTTP TCP | 0.045 | 0.037 | 0.008 | |
| ○ Connected IPs | Connected IPs | | | | |
| ○ Member IPs | Member IPs | | | | |
| 10.10.2.126 | 10.10.2.125 | 0.013 | 0.010 | 0.002 | |
| 207.96.196.77 | 207.96.196.77 | 0.002 | 0.002 | 0.000 | |
| 65.213.230.24 | ads.traderonline.com | 0.002 | 0.001 | 0.000 | |
| 216.33.88.141 | www.cars.com | 0.001 | 0.001 | 0.000 | |
| 65.213.230.30 | images.traderonline.com | 0.001 | 0.001 | 0.000 | |
| 65.213.230.38 | adcache.traderonline.com | 0.001 | 0.001 | 0.000 | |
| ○ 10.10.2.61 | 10.10.2.61 | 0.006 | 0.005 | 0.000 | |
| ○ 10.10.2.53 | 10.10.2.53 | 0.005 | 0.001 | 0.004 | |
| ○ 10.10.0.184 | junker.fractal.network... | 0.004 | 0.001 | 0.003 | |
| ○ 10.10.2.57 | 10.10.2.57 | 0.003 | 0.003 | 0.001 | |
| ○ SMTP TCP | SMTP TCP | 0.003 | 0.000 | 0.003 | |
| ○ HTTPS-MAIN TCP | HTTPS-MAIN TCP | 0.003 | 0.003 | 0.001 | |
| ○ POP3 TCP | POP3 TCP | 0.001 | 0.001 | 0.001 | |
| ○ MSN-MESSENGER TCP | MSN-MESSENGER TCP | 0.000 | 0.000 | 0.000 | |
| ○ Other Ports | Other Ports | | | | |
| ○ UDP | USER DATAGRAM PROTOCOL | 0.051 | 0.025 | 0.026 | |
| ○ Other IP Protocols | Other IP Protocols | 0.001 | 0.001 | 0.001 | 11.753 |
| ○ Internet | All Internet Traffic | 0.691 | 0.395 | 0.296 | 88.986 |
| ○ NV - Employees | DHCP clients, includin... | 0.552 | 0.392 | 0.160 | 135.962 |

METHOD AND SYSTEM FOR GROUPING DIAGNOSTIC INFORMATION

FIELD OF THE INVENTION

The present invention generally pertains to the field of monitoring computer networks. Specifically, the present invention pertains to the field of collecting and analyzing data in order to detect intrusions and understand network performance.

BACKGROUND

One of the key challenges in modern enterprise networks is monitoring network traffic across nodes that simultaneously play multiple diverse roles within the network. Examples of network nodes include an employee's personal computer, an email server, a web application server, a database server, and a file server. The applications running on these nodes use the IP Protocol layer to establish inter-nodal connections for communication and information transfer.

Each IP connection consists of a client (typically the node that initiates the connection) and a server. Networked nodes may concurrently act as both a client and a server, depending on the applications they run. For example, a personal computer node can act as a client, by browsing and downloading web pages, at the same time as it is acting as a server, by sending email attachments. A web application server can act as a client by requesting information from a database server, while it also performs its function as a server in responding to application requests by clients that connect with it. Furthermore, while nodes are acting as both a server and client, they are often members of one or more logical groups.

Traditional network monitoring solutions group network traffic according to whether a network node is a client or a server. Useful metrics such as total throughput for the node disregard whether the node is acting as a server or a client. Other metrics, such as total response time, requests served, and connections established require knowledge of whether the node is acting as a client or a server but are more meaningful when aggregated with other node metrics.

In addition, traditional device-centric methods of measuring network utilization require that device-specific diagnostics or parameters (e.g., the number of packets passing through a particular router) be read and then later aggregated at some central location to determine overall utilization of network resources. These processes are manually intensive and rapidly become unmanageable in the face of network reconfigurations and scaling. While such processes may ultimately provide indications of some parameters, for example bandwidth utilization, they often provide little or no information about the actual end-to-end performance for servers and clients passing traffic across the link of interest. Furthermore, information at the individual node level in a large network comprises information at thousands of nodes and is often too much to process in order to receive a real-time picture of the network. Therefore, a new method of grouping diagnostic information is required.

SUMMARY OF THE INVENTION

A method and system for grouping network diagnostic information is described. Client network traffic data and server network traffic data regarding a number of network nodes is collected and then grouped by IP address. The network nodes are divided into logical groupings and the network traffic data is presented in the aggregate for all IP addresses in each logical group. The logical groupings may be further divided by protocol, application, port and/or logical group-to-group. Each logical group can be further generalized as either a set of IP addresses (e.g., a business group) or a specific logical link between one set of IP addresses to another set of IP addresses (e.g., a business group link). Either or both of these "groups" may be divided in further logical sub-groups: for example, by protocol, application, port and in the case of business groups, group-to-group. The logical groups provide facilities for initial problem detection and identification while the logical sub-groups provide facilities for troubleshooting and problem isolation.

BRIEF DESCRIPTION OF THE DRAWINGS

The present invention is illustrated by way of example, and not limitation, in the figures of the accompanying drawings in which:

FIG. 3 shows an exemplary view of the presentation of network traffic data in the aggregate for all IP addresses in each logical group in accordance with an embodiment of the present invention.

DETAILED DESCRIPTION

In the following description, examples of logical groupings of network diagnostic information are set forth. By using logical groupings such as those described herein, network operators and others can measure network resource utilization independent of any nodes between information sources and destinations (i.e., the logical groupings permit monitoring of inter-group traffic); to understand the actual end-to-end performance between the sources and destinations. Such groupings also allow the traffic metrics to be stored in a meaningful and scaleable manner and in ways that are more immune to network topology changes (e.g., than traditional monitoring methods). These examples, however, are not meant to be restrictive. Thus, the true measure of the present invention should not be restricted to the examples set forth below, but rather should be consistent with the scope of the claims which follow that discussion.

Figure 1:
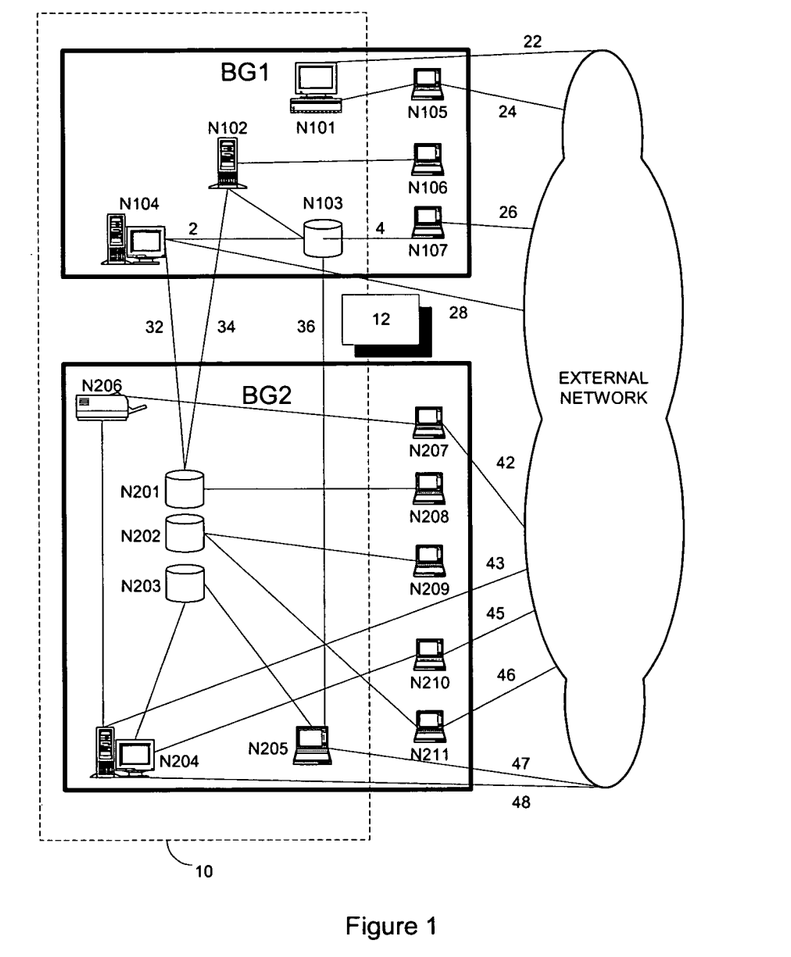
FIG. 1 shows a diagrammatic representation of an exemplary group of networked nodes wherein the methods of the present invention may be practiced.

FIG. 1 shows a diagrammatic representation of an exemplary group of networked nodes wherein the methods of the present invention may be practiced. Lines between entities are network links, which may be any mode of establishing a connection between nodes including wired and/or wireless connections.

In this embodiment, a firewall 10 surrounds a geographic collection of networked nodes and separates the internal network from the external network. A network traffic monitoring device 12 is shown at the firewall. However, as will be apparent to one skilled in the art, the network traffic monitoring device 12 may be located within the internal network, or on the external network or anywhere that allows the method of the present invention to be practiced. Note, entity 12 need not be "inline." That is, traffic need not necessarily pass through entity 12 in order to pass from the server to the client and vice versa. The entity 12 can be a passive monitoring device, e.g., spanning a switch or router, whereby all the traffic is copied to a switch span port which passes traffic to entity 12.

As shown in FIG. 1, a modern network may include multiple logical groups (e.g., BG1, BG2) of nodes. Logical groups may be business groups, computers performing the same function, computers located within the same building, or any other logical groupings. FIG. 1 shows one simple organization of a small number of computers and other network nodes, but those skilled in the art will appreciate that the number of computers and network nodes may be significantly larger as can the number of connections between them. Modern network configurations are mutable and complex, which is one of the reasons why the present invention is useful. Information representing the total utilization of all nodes in particular directions or activities provides much greater visibility into overall network traffic than does a large collection of individualized node information. The present invention groups network traffic into logical groups that the user can configure, such as frame relay links, or business units BG1, BG2 in order to allow visibility of network traffic relative to the logical group as a whole.

In the exemplary embodiment shown here, BG1 contains several internal network nodes N101, N102, N103, and N104 and external nodes N105, N106 and N107. Similarly, BG2 contains several internal network nodes N201, N202, N203, N204, N205, N206. A network node may be any computer or device on the network that communicates with other computers or devices on the network.

Each node may function as a client, server, or both. For example, node N103, is shown as a database which is connected to Node N104, a web application server, via a network link 2. In this configuration, it is typical for node N104 to function as a client of node 103 by requesting database results. However N104 is also depicted as connected to the external network via network link 28. In this configuration, it is typical for N104 to function as a server, which returns results in response to requests from the external network. Similarly, database node N103, which functions as a server to N104, is shown connected to node N107 via a network link 4. N107 may upload information to the database via link 4, whereby N107 is functioning as a server and N103 is functioning as a client. However, N107 is also shown connected to the external network via link 26. This link could indicate that N107 is browsing the Internet and functioning as a client.

Furthermore, network nodes need not be within the internal network in order to belong to a logical group. For example, traveling employees may connect to the logical group network via a Virtual Private Network (VPN) or via ordinary network transport protocols through an external network such as the Internet. As shown in FIG. 1, network nodes N105, N106, N107 belong to logical group BG1, but are outside the firewall, and may be geographically distant from the other network nodes in BG1. Similarly, network nodes N207, N208, N209, N210, N211 are members of logical group BG2, but are physically removed from the other members of BG2. It is important to note that the firewall in this configuration is for illustrative purposes only and is not a required element in networks where the present invention may be practiced. The separation between internal and external nodes of a network may also be formed by geographic distance, or by networking paths (that may be disparate or require many hops for the nodes to connect to one another regardless of the geographic proximity).

Figure 2:
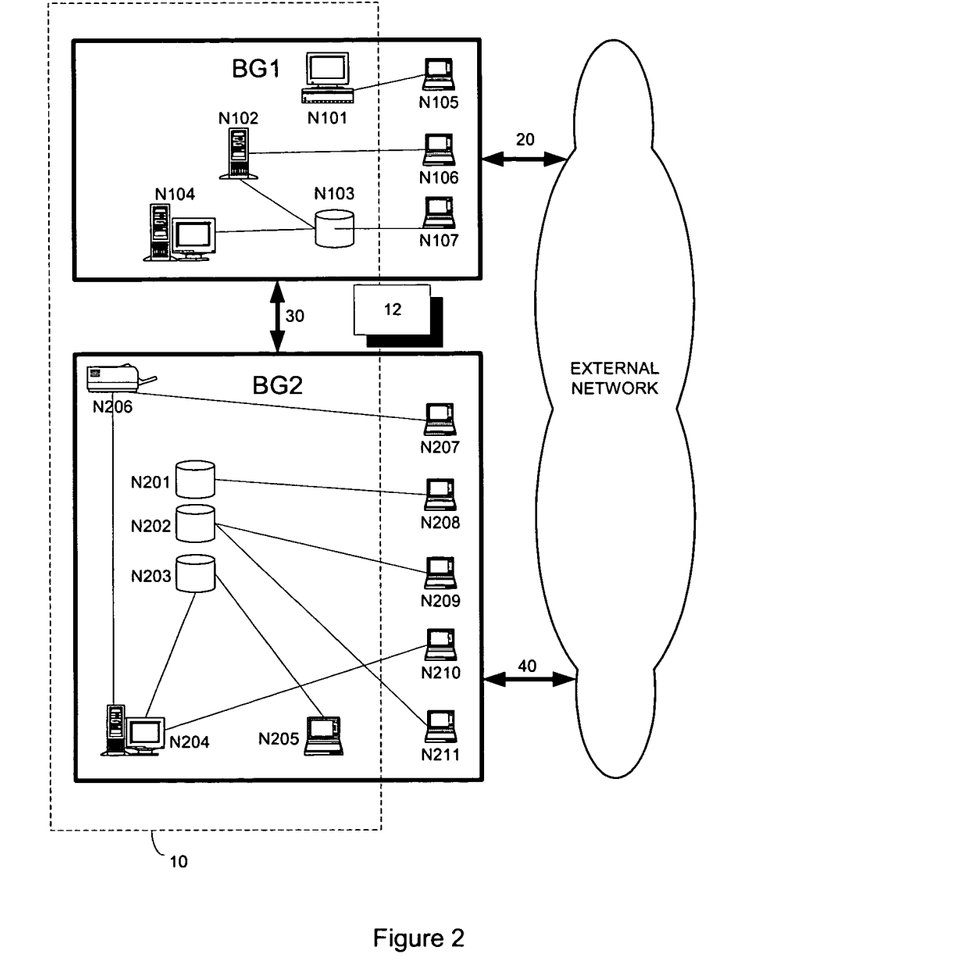
FIG. 2 shows a diagrammatic representation of one of the views of network traffic that the present invention provides.

FIG. 2 shows a diagrammatic representation of one of the views of network traffic that the present invention provides. In FIG. 1, nodes N101, N104, N105, and N107 are depicted as connected to the external network via network links 22, 24, 26, and 28. The present invention groups all network traffic into and out of the same logical group BG1 into one view, so that the traffic over multiple links 22, 24, 26, 28 to the external network is condensed into one virtual link containing all inbound and outbound traffic 20 between the logical group BG1 and the external network. A similar condensation of network traffic is depicted in the views of BG2 in FIG. 1 and in FIG. 2. In FIG. 1, six links 42, 43, 45, 46, 47, 48 between the external network and the logical group BG2 are depicted. In FIG. 2, all links between BG2 and the external network are condensed into one virtual link 40 over which the aggregate traffic network metrics for the logical group may be viewed. FIG. 2 also shows the condensation of multiple links 32, 34, 36 between logical groups BG1, BG2 into one virtual link 30 over which aggregate network traffic between logical groups may be viewed and analyzed. Note that the internal traffic within each logical group is not included in the aggregate view of the network traffic into and out of the logical group.

For vector metrics that have a direction, such as throughput, the method of the present invention allows the information to be presented from the viewpoint of a selected logical group. For example, if BG1 is the selected logical group for the viewpoint of network traffic data, outbound traffic will include traffic on virtual link 20 that is going to the external network and traffic on virtual link 30 that is going to BG2. The second component of the total output for BG1, namely the outbound traffic to BG2, is also a component of inbound traffic for BG2. So, if the selected logical group for the viewpoint of network traffic data is BG2, the total inbound traffic metric will include inbound network traffic over virtual link 40 as well as inbound traffic from BG1 over virtual link 30. In order to avoid storing the same metric twice (traffic from BG1 to BG2), the method of the present invention combines the selected logical group with vector metrics between logical groups in order to present the network traffic data properly. For example, all nodes within BG1 may default to BG1 as the viewpoint of choice when viewing network traffic data according to the method of the present invention. In an alternate embodiment, a user may select any logical group as the reference viewpoint when viewing network traffic data.

In addition to vector metrics, the present invention also accommodates scalar role-specific metrics; that is metrics that are associated with a logical group (as defined by one or more IP addresses), either when the logical group is acting as a server or as a client. For example, application response time can either be associated with the servers of a logical group, or, indirectly, with the clients of a logical group. If it is associated with the clients of a logical group, the metric describes the application response time of all the servers that the clients of the logical group are communicating with. So, the present invention allows information to be presented from the viewpoint of the roles of a selected logical group thereby providing for side-by-side comparisons of both vector and scalar role-specific metrics for a given logical grouping. In other words, this allows both utilization and performance information to be viewed side-by-side for a given logical group. Such capabilities are not found in conventional network monitoring systems.

FIG. 3 shows an exemplary view of the presentation of network traffic data in the aggregate for all IP addresses in each logical group. Each entry in the left column indicates the entity for which the network traffic data is being presented. Each column to the right contains a network traffic metric such as total throughput 318, inbound throughput 320, outbound throughput 322, and round trip time 324.

The left column may present multiple logical groups. For example, logical groups may include designations such as Headquarters 300, the Internet 302, and Employees 304. Each logical group view of the network traffic data may be expanded into a more detailed view (for example, of associated logical sub-groups), which shows local traffic 306 and connected logical groups 308. Furthermore, the logical group view offers several further expanded views, or drilldown views of network traffic data. In one embodiment, network traffic data belonging to individual nodes associated with the group such as connected IP addresses 310 (for nodes outside of the logical group that are connected to the logical group) and member IP addresses 312 is available in an expanded view. In another embodiment, drilldown views of network traffic data by IP protocols 314 (e.g., GRE, TCP, UDP, etc.) are available. In yet another embodiment, further drill down views of network traffic data are available by application type 316, which are then divided into connected IP addresses (nodes external to the logical group) and member IP addresses (nodes internal to the logical group).

These additional drilldowns or logical sub-groupings are especially useful for troubleshooting purposes. For example, once the network diagnostic information is displayed for a given logical group, the next process in troubleshooting a problem is often to isolate any issues to further logical sub-groups. For example, having isolated a problem to a particular sub-group, a network technician might then go on to discover which application in that sub-group is experiencing the problem. Having isolated the application, the technician may then drilldown to determine which employee (i.e., Connected IP in the illustration shown in FIG. 3) is using the application, and finally, which application server the employee is using (e.g., available through the Connected IP>Member IP drilldown).

The reference viewpoint of the originally selected logical group is passed down to the drill downs as well. For example, in FIG. 3, the selected logical group is MV headquarters 300, which means that all of the data displayed in the drill down views under the MV headquarters group 300 is relative to MV headquarters (i.e., inbound throughput 320 is into MV headquarters and outbound throughput 322 is out of MV headquarters).

Each of the columns to the right of the logical group and drill down column include information and/or metrics to help diagnose problems within the network. It is important to note that all metrics available on a time-binned basis are presented as such. In other words, the method of the present invention does not wait until the connection has closed in order to report on network traffic. Examples of TCP-connection based performance metrics that are available for time-binned reporting (e.g., the amount or magnitude observed within the last minute, hour, day, week, and month) include connection setup time, time to first byte, application response time, connection rate, connection request rate, round trip time, and packet loss.

Thus, the present invention provides a method for grouping network diagnostic information, in which client network traffic data and server network traffic data regarding a plurality of network nodes is collected and grouped by IP address into total network traffic data. Subsequently, the network nodes may be divided into one or more logical groups containing one or more IP addresses; and the total network traffic data for all IP addresses in each logical group presented in the aggregate. In various embodiments, this may include presenting total network traffic throughput for the logical group, presenting total incoming network traffic for the logical group, presenting total outgoing network traffic for the logical group, presenting total network traffic between logical groups, and/or presenting the total network traffic data from the perspective of a selected logical group.

Alternatively or in addition, a node-level view of the total network traffic data may be presented for each logical group. This may include presenting the total network traffic data from the perspective of a selected logical group. Likewise, an application-level view of the total network traffic data for all IP addresses in each logical group may be presented. This may include presenting the total network traffic data from the perspective of a selected logical group.

For various embodiments of the present invention, the total network traffic data may include time-binned statistics, region-independent application response time (e.g., as measured by subtracting a server-side latency from an overall client-server response time as discussed below). Often, the total network traffic data will be presented so as to include vector and scalar role-based metrics, for example in side-by-side fashion. Vector metrics are those having an associated direction, while scalar role-based metrics are associated with a logical group as defined by one or more IP addresses either when the logical group is acting as a server or as a client.

In some embodiments, the total network traffic data is presented by protocol, by port, by application, or by member-connected IP address per logical group. In this latter case, the total network traffic data is presented, for each logical group, by any or all of a logical group member IP address, a logical group connected IP address, a logical group member and then a logical group connected IP address, and a logical group connected and then a logical group member IP address. In still further embodiments, the total network traffic data may be presented by member-connected IP address per logical application sub-group, by member-connected IP address per logical group-to-group connection, by member-connected IP address per logical application group-to-group connection, by member-connected IP address per logical port sub-group, in a role-based fashion for the IP addresses, and/or from a standpoint of a common reference point.

Figure 4:
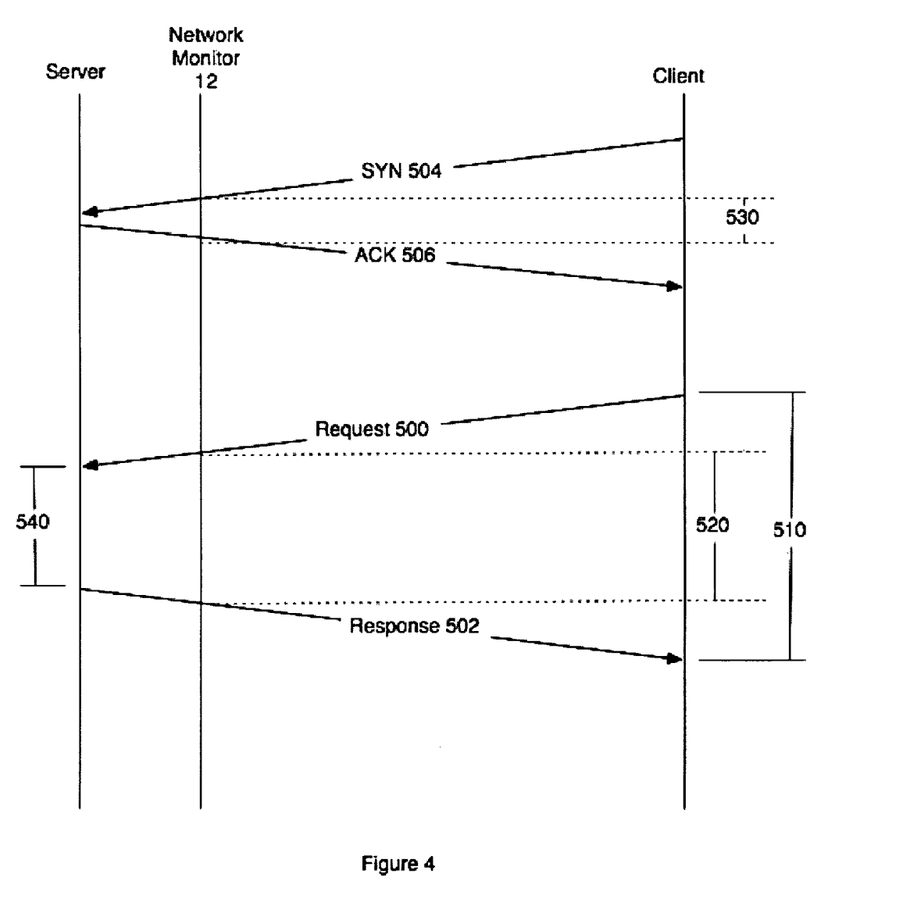
FIG. 4 shows a diagrammatic representation of the calculation of region independent application response time, which is one type of network traffic data that may be presented according to the present invention.

FIG. 4 shows a diagrammatic representation of the calculation of region independent application response time, which is one type of network traffic data that may be presented according to the present invention. In a normal client-server communication, the client sends a request 500, the server takes some time to process the request 540 and the server sends a response 502. The time between the client request and the client's receipt of the response 510, includes network latency between the client and server, wherever they may be located on the network. The network traffic monitoring device 12 observes the traffic associated with this client-server communication at some point after the client request 500 is sent and at some point after the server response 520 is sent. The time 520 between the network traffic monitoring device's observation of the request 500 and response 502 is not a true measurement of the server response time 540 because it includes the round-trip travel time of the IP packets between the traffic monitoring device 12 and the server. Therefore, if the network traffic monitoring device makes the measurement of server response time as defined by 520, the network latency between the server and the network monitoring device is included, and the server response time depends upon the region where the traffic monitoring device 12 is located. To obtain a region-independent application server response time, the method of the present invention includes subtracting the round trip time 530 between the traffic monitoring device 12 and the server. The round trip time 530 is measured as the time between when a SYN packet 504 from the client is observed by the network traffic monitoring device 12 and when the corresponding ACK packet 506 from the server is observed by the network traffic monitoring device 12. This measurement includes the round-trip network latency between the network traffic monitoring device 12 and the server and a nominal network interface delay between receipt of the SYN packet 504 and sending of the ACK packet 506.

Figure 5:
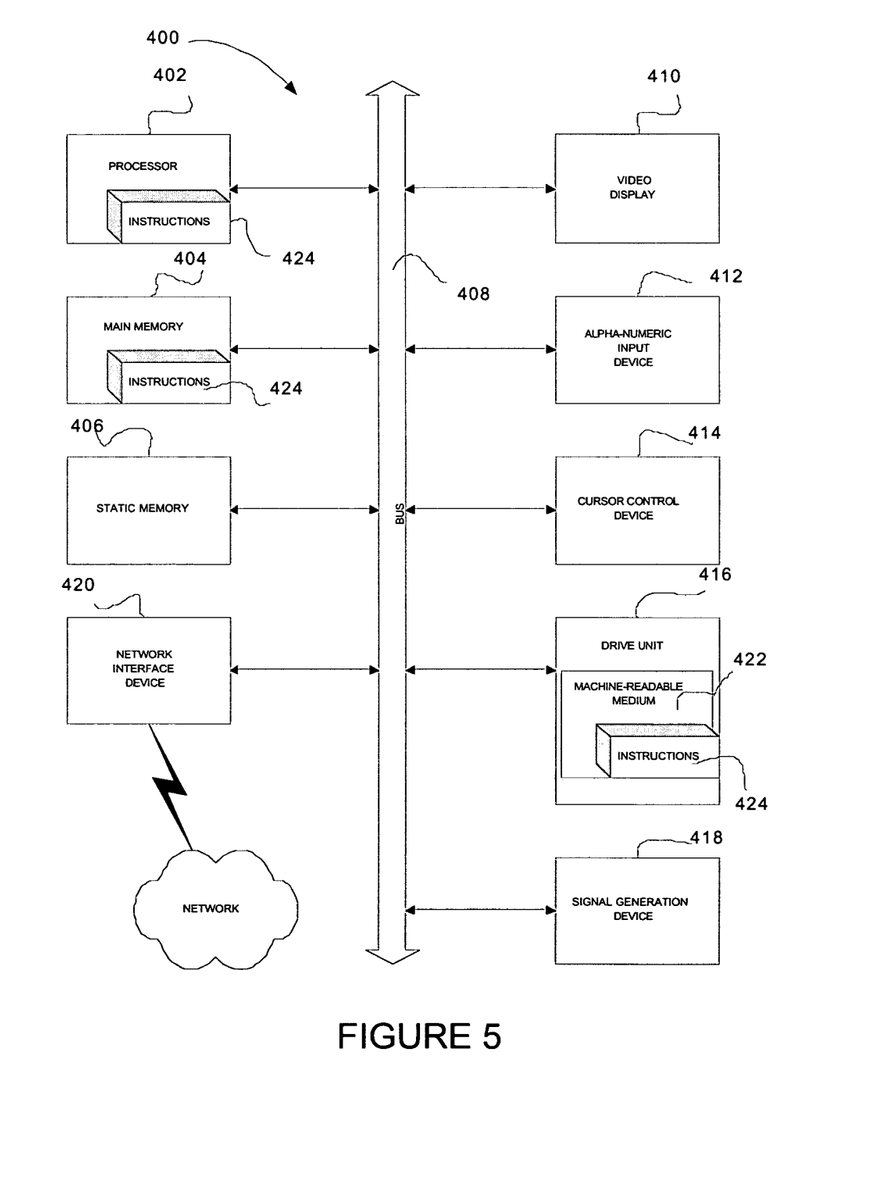
FIG. 5 shows a diagrammatic representation of a machine in the exemplary form of a computer system within which a set of instructions for causing the machine to perform a program configured in accordance with an embodiment of the present invention may be executed.

FIG. 5 shows a diagrammatic representation of a machine in the exemplary form of a computer system 400 within which a set of instructions, for causing the machine to perform a program configured in accordance with an embodiment of the present invention. In alternative embodiments, the machine operates as a standalone device or may be connected (e.g., networked) to other machines, in which case it may be a node in the network. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software) 424 embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media. The software 424 may further be transmitted or received over a network 426 via the network interface device 420.

While the machine-readable medium 422 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for grouping network diagnostic information is described. Although the present invention has been described with reference to specific exemplary embodiments, it will be evident that various modifications and changes may be made to these embodiments without departing from the broader spirit and scope of the invention. Accordingly, the true scope of the present invention should be measured only in terms of the claims, which now follow.

What is claimed is:

1. A method for grouping network diagnostic information on a network analysis system, comprising:
   collecting, on the network analysis system, client network traffic data and server network traffic data regarding a plurality of network nodes;
   grouping, on the network analysis system, the client network traffic data and the server network traffic by IP address into total network traffic data;
   dividing, on the network analysis system, the plurality of network nodes into one or more logical groups containing one or more IP addresses, wherein at least one of the one or more logical groups includes a plurality of logical sub-groups; and
   presenting, on the network analysis system, a user interface that allows a user to selectively view statistics associated with the total network traffic data for each logical group, and each logical sub-group.

2. The method of claim 1, wherein the statistics include total network traffic throughput.

3. The method of claim 1, wherein the statistics include total incoming network traffic.

4. The method of claim 1, wherein the statistics include total outgoing network traffic for the logical group.

5. The method of claim 1, wherein the statistics include total network traffic between logical groups.

6. The method of claim 1, wherein presenting the statistics includes presenting the total network traffic data from the perspective of a selected logical group or sub-group.

7. The method of claim 1, further comprising presenting a node-level view of the total network traffic data for each logical group or sub-group.

8. The method of claim 7, wherein presenting the node-level view includes presenting the total network traffic data from the perspective of a selected logical group or sub-group.

9. The method of claim 1, further comprising presenting an application-level view of the total network traffic data for all IP addresses in each logical group or sub-group.

10. The method of claim 9, wherein presenting the application-level view includes presenting the total network traffic data from a perspective of a selected logical group or sub-group.

11. The method of claim 1, wherein the statistics include time-binned statistics.

12. The method of claim 1, wherein the statistics include region-independent application response time.

13. The method of claim 12, wherein the region-independent application response time is measured by subtracting a server-side latency from an overall client-server response time.

14. The method of claim 1, wherein the statistics are presented so as to include vector and scalar role-based metrics.

15. The method of claim 14, wherein the vector and scalar role-based metrics are presented in side-by-side fashion.

16. The method of claim 14, wherein the vector metrics comprise metrics having an associated direction.

17. The method of claim 14, wherein the scalar role-based metrics comprise metrics associated with a logical group or sub-group either when the logical group or sub-group is acting as a server or as a client.

18. The method of claim 1, wherein the statistics include total network traffic by protocol.

19. The method of claim 1, wherein the statistics include total network traffic by ports.

20. The method of claim 1, wherein the statistics include total network traffic by application.

21. The method of claim 1, wherein the statistics include total network traffic by member-connected IP address per logical group or sub-group.

22. The method of claim 21, wherein presenting the statistics includes, presenting, for each logical group or sub-group, the traffic data by any or all of a logical group or sub-group member IP address, a logical group or sub-group connected IP address, a logical group or sub-group member and then a logical group or sub-group connected IP address, and a logical group or sub-group connected and then a logical group or sub-group member IP address.

23. The method of claim 1, wherein the statistics include total network traffic by member-connected IP address per logical application sub-group.

24. The method of claim 1, wherein the statistics include total network traffic by member-connected IP address per logical group-to-group connection.

25. The method of claim 1, wherein the statistics include total network traffic by member-connected IP address per logical application group-to-group connection.

26. The method of claim 1, wherein the statistics include total network traffic by member-connected IP address per logical port sub-group.

27. The method of claim 1, wherein the statistics are presented in a role-based fashion for the IP addresses.

28. The method of claim 1, wherein the statistics are presented with from a standpoint of a common reference point.

29. A non-transitory computer storage medium upon which is stored a computer program comprising instructions, which when executed on a processor, cause the processor to
collect client network traffic data and server network traffic data regarding a plurality of network nodes;
group the client network traffic data and server network traffic by IP address into total network traffic data; divide the plurality of network nodes into one or more logical groups containing one or more IP addresses wherein at least one of the logical groups includes a plurality of sub-groups; and
present, via a display device, a user interface that allows a user to selectively view statistics associated with the total network traffic data for each logical group and sub-group.

30. A computer-implemented method for execution on a network analysis system, comprising
grouping, on the network analysis system, into a plurality of logical units network traffic data regarding a number of network nodes; and
subsequently presenting, on the network analysis system, the network traffic data according to a selected logical sub-grouping of one of the logical units, the sub-grouping being one of: a protocol sub-group, an application sub-group, a port sub-group or a logical group-to-group sub-group.

31. The computer-implemented method of claim 30, wherein one or more of the logical units comprises a set of IP addresses.

32. The computer-implemented method of claim 30, wherein one or more of the logical units comprises a logical link between one set of IP addresses and another set of IP addresses.

33. The computer-implemented method of claim 30, wherein presenting the network traffic data includes presenting total network traffic throughput for the logical units.

34. The computer-implemented method of claim 30, wherein presenting the network traffic data includes presenting total incoming network traffic for the logical units.

35. The computer-implemented method of claim 30, wherein presenting the network traffic data includes presenting total outgoing network traffic for the logical units.

36. The computer-implemented method of claim 30, wherein presenting the network traffic data includes presenting total network traffic between logical units.

37. The computer-implemented method of claim 30, wherein presenting the network traffic data includes presenting total network traffic data from a perspective of a selected logical unit.

38. The computer-implemented method of claim 30, further comprising presenting a node-level view of the network traffic data for each logical unit.

39. The computer-implemented method of claim 38, wherein presenting the node-level view includes presenting total network traffic data from a perspective of a selected logical unit.

40. The computer-implemented method of claim 30, further comprising presenting an application-level view of the network traffic data for all IP addresses in each logical unit.

41. The computer-implemented method of claim 40, wherein presenting the application-level view of the network traffic data includes presenting the network traffic data from a perspective of a selected logical unit.

42. The computer-implemented method of claim 40, wherein the network traffic data includes time-binned statistics.

43. The computer-implemented method of claim 40, wherein the network traffic data includes region-independent application response time.

44. The computer-implemented method of claim 40, wherein region-independent application response time is measured by subtracting a server-side latency from an overall client-server response time.

45. The computer-implemented method of claim 40, wherein the network traffic data is presented so as to include vector and scalar role-based metrics.

46. The computer-implemented method of claim 45, wherein the vector and scalar role-based metrics are presented in side-by-side fashion.

47. The computer-implemented method of claim 40, wherein presenting the network traffic data includes presenting network traffic by protocol.

48. The computer-implemented method of claim 40, wherein presenting the network traffic data includes presenting network traffic by ports.

49. The computer-implemented method of claim 40, wherein presenting the network traffic data includes presenting network traffic by application.

50. The computer-implemented method of claim 40, wherein presenting the network traffic data includes presenting network traffic by member-connected IP address per logical unit.

51. The computer-implemented method of claim 40, wherein presenting the network traffic data includes presenting network traffic by member-connected IP address per logical application sub-group.

52. The computer-implemented method of claim 40, wherein presenting the network traffic data includes presenting network traffic by member-connected IP address per logical group-to-group connection.

53. The computer-implemented method of claim 40, wherein presenting the network traffic data includes presenting network traffic by member-connected IP address per logical application group-to-group connection.

54. The computer-implemented method of claim 40, wherein the network traffic data is presented in a role-based fashion for each IP address associated with each logical unit.

\* \* \* \* \*